United States Patent
Scothern (10) Patent No.: US 10,753,393 B2
(45) Date of Patent: Aug. 25, 2020

(54) BEARING ASSEMBLY (71) Applicant: ROLLS-ROYCE plc, London (GB)

(72) Inventor: David P. Scothern, Derby (GB)

(73) Assignee: ROLLS-ROYCE plc, London (GB)

( * ) Notice: Subject to any disclaimer, the term of this patent is extended or adjusted under 35 U.S.C. 154(b) by 120 days.

(21) Appl. No.: 16/106,950

(22) Filed: Aug. 21, 2018

(65) Prior Publication Data

US 2019/0085903 A1 Mar. 21, 2019

(30) Foreign Application Priority Data

Sep. 20, 2017 (GB) .................................. 1715165.5

(51) Int. Cl.
F16C 33/08 (2006.01)
F01D 17/16 (2006.01)
F16C 17/02 (2006.01)
F16C 35/02 (2006.01)
F04D 29/56 (2006.01)
F16C 43/02 (2006.01)

(52) U.S. Cl.
CPC ............ F16C 33/08 (2013.01); F01D 17/162 (2013.01); F16C 17/02 (2013.01); F04D 29/563 (2013.01); F05D 2240/50 (2013.01); F16C 35/02 (2013.01); F16C 43/02 (2013.01); F16C 2360/23 (2013.01)

(58) Field of Classification Search
CPC ....................................................... F16C 35/10
See application file for complete search history.

(56) References Cited

U.S. PATENT DOCUMENTS

| | | | |
|---|---|---|---|
| 3,887,976 A | 6/1975 | Sheilds et al. | |
| 4,514,141 A | 4/1985 | Marey | |
| 4,604,030 A * | 8/1986 | Naudet | F01D 11/001 415/126 |
| 5,593,275 A * | 1/1997 | Venkatasubbu | F01D 17/162 415/160 |
| 6,086,327 A | 7/2000 | Mack et al. | |
| 9,341,194 B2 * | 5/2016 | Lockyer | F04D 29/563 |
| 2014/0234085 A1 | 8/2014 | Maliniak et al. | |

OTHER PUBLICATIONS

Great Britain Search Report dated Mar. 5, 2018, issued in GB Patent Application No. 1715165.5.

* cited by examiner

Primary Examiner — Brian P Wolcott
Assistant Examiner — Jason G Davis
(74) Attorney, Agent, or Firm — Oliff PLC (57) ABSTRACT A bearing arrangement comprising a shaft with a recess in its end, a bearing housing, an annular first bush comprising an inner first portion and an inner second portion and a second bush that engages the recess of the shaft. The first bush bears against the bearing housing. The shaft engages the inner first portion of the first bush. The second bush engages the inner second portion of the first bush.

13 Claims, 5 Drawing Sheets

BEARING ASSEMBLY

CROSS-REFERENCE TO RELATED APPLICATIONS

This application is based upon and claims the benefit of priority from British Patent Application Number 1715165.5 filed 20 Sep. 2017, the entire contents of which are incorporated by reference.

BACKGROUND

Technical Field

The present disclosure concerns a bearing arrangement, a bearing assembly, a set of variable stator vanes for a gas turbine engine and a method of manufacturing a set of variable stator vanes.

Description of the Related Art

Gas turbine engines comprise compressors that impart energy to the air flowing through the engine. Compressors may comprise rotors and stators. The stators are used to reduce swirl and achieve a rise in static pressure. However, especially as the operating speeds and pressure ratios of compressors are increased, it becomes harder to design the rotors and stators for stable operation across the range of operating conditions. For example, at off-design conditions, such as lower speed operation, the compressor may experience rotating stall. This problem can be overcome by introducing Variable Stator Vanes (VSVs). By closing the variable stator vanes at low airflow speeds this reduces the incidence of airflow onto the subsequent stage rotor blades to an angle that the blades can tolerate.

Polymer bushes may be used to minimise friction between such VSVs and the casing in which they are mounted, as the vane incidence angle is varied.

Figure 1:
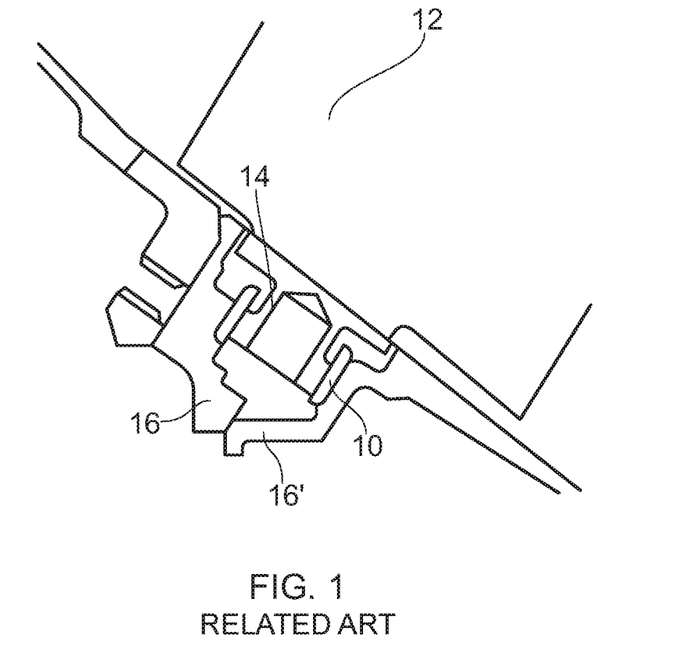
FIG. 1 is a sectional view of a typical VSV bush.

FIG. 1 shows a typical bearing arrangement for a VSV. In FIG. 1, parts 16 and 16' form the housing for the bush 10. A shaft 14 extends from the variable stator vane 12, and the shaft 14 is received by the bush 10 and rotates against it. The bush 10 and housing 16, 16' resist radial forces experienced by the variable stator vane 12 about its own axis of rotation.

Variable stator vane bushes are subject to wear due to the bearing forces and rotation. It is desirable to have an improved wear resistant variable stator vane bush that fits within the assembly constraints of the variable stator vane assembly.

SUMMARY

According to an aspect there is provided a bearing arrangement comprising a shaft with a recess in its end, a bearing housing, an annular first bush comprising an inner first portion and an inner second portion and a second bush that engages the recess of the shaft. The first bush bears against the bearing housing. The shaft engages the inner first portion of the first bush. The second bush engages the inner second portion of the first bush.

According to an aspect there is provided a method of manufacturing a set of variable stator vanes (VSVs) as described and/or claimed hererin, wherein the set of VSVs further comprise an outer casing of a gas turbine engine. The method comprises assembling a plurality of variable stator vanes into the outer casing such that they project radially inwardly from the outer casing around the circumference of the outer casing. The method further comprises placing each first bush and second bush into their respective (e.g. corresponding) bearing housing. The method further comprises compressing the inner shroud such that its radius is reduced. The method further comprises positioning the inner shroud radially inward of the assembled variable stator vanes. The method further comprises releasing the compression on the inner shroud such that it is allowed to return to its original radius, and in the process the shaft of each variable stator vane is inserted into each corresponding (e.g. respective) bearing housing on the inner shroud.

Compressing the inner shroud may include pulling in the inner shroud. Compressing the inner shroud may reduce the radius of curvature of the inner shroud (e.g. via elastic deformation). Compressing the inner shroud may be performed with or without tooling.

After the inner shroud has been positioned inward of the assembled Variable Stator Vanes, each bearing housing may be aligned with its corresponding VSV shaft (e.g. be aligned with the same circumferential position).

The first bush inner first portion and the first bush inner second portion may be surfaces, for example cylindrical surfaces. The first bush inner first portion and the first bush inner second portion may be two parts of the same surface. The first bush inner first portion and the first bush inner second portion may be two separate surfaces. The inner first portion and the inner second portion may be axially separated. The inner first portion and the inner second portion may be radially separated.

The bearing arrangement may be configured to transmit loads from the shaft to the bearing housing through the first bush (e.g. a first load path). The bearing arrangement may be configured to transmit loads from the shaft to the bearing housing through the second bush and the first bush (e.g. a second load path). The bearing arrangement may be configured to transmit loads through two different loads paths.

The second bush may be positioned adjacent the end of the shaft. The second bush may extend beyond the end of the shaft. The second bush may be positioned such that it effectively extends the length of the shaft.

The first bush inner first portion and inner second portion may have the same radius. The first bush inner first portion and inner second portion may not have the same radius.

The first bush may transmit axial loads from the shaft to the bearing housing. Axial loads from the shaft may only be transmitted to the bearing housing via the first bush. In an assembled state, the second bush is arranged such that it cannot transmit axial loads from the shaft to the bearing housing due to the arrangement of the first bush. The first bush and second bush may transmit axial loads from the shaft to the bearing housing.

The recess may be a blind hole in the end of the shaft. The recess may be configured to include surfaces capable of transferring radial loads from the shaft to the second bush. The recess may have an inner surface. The second bush may bear against the inner surface of the recess.

The shaft, recess, bearing housing, annular first bush and/or second bush may be cylindrical.

The second bush may comprise a main section and a stem extending from the main section. The stem may be thinner than the main section (for example it may have a smaller radius). The stem may engage the recess of the shaft. The main section may engage the inner second portion of the first bush.

The second bush may comprise an annular third bush portion. The third bush portion may be positioned between the stem and the recess of the shaft. The third bush portion may be considered to be a part of the second bush, even though it may be manufactured and/or assembled separately from the second bush.

The third bush portion may be arranged across a contact area between the stem and the recess of the shaft. The second bush may engage the recess of the shaft through the annular third bush portion. The stem may comprise the annular third bush portion. The annular third bush portion may cover the stem. The annular third bush portion may be located between the stem and the inner surface of the recess. When an annular third bush portion is present, the stem may not contact the recess directly.

The bearing assembly may comprise additional bushes (e.g. a third bush) that span the contact areas between components of the bearing assembly that rotate against each other.

The stem may be radially thinner than the main section. The stem may have a maximum radius that is smaller than the maximum radius of the main section.

The bearing housing may be formed of a blind hole in a solid component. The bearing housing may only be open at one end. The solid component may be an inner shroud of a gas turbine engine.

The shaft may not rotate more than 180 degrees, for example in normal use in a gas turbine engine. The shaft may only complete partial revolutions.

According to an aspect there is provided a bearing assembly comprising the bearing arrangement as claimed and/or described herein, the assembly further comprising a rotatable component. The shaft may extend from the rotatable component. The rotatable component may be a variable stator vane of a gas turbine engine.

According to an aspect there is provided a set of variable stator vanes for a gas turbine engine, the apparatus comprising a plurality of bearing assemblies as described and/or claimed herein, and an inner shroud of a gas turbine engine. Each bearing housing may be formed in the inner shroud. Each bearing housing may be regularly spaced around the inner shroud.

The plurality of bearing assemblies may share a common inner shroud. The plurality of bearing assemblies may be regularly spaced around the radially outer surface of the inner shroud. The inner shroud may have at least one blind hole that forms a bearing housing. A bearing housing may be an inner shroud of a gas turbine engine. Each bearing housing may be a portion of the inner shroud. The plurality of bearing housings may each be a different portion of a common inner shroud.

The inner shroud may be a split ring inner shroud that only extends part way around the circumference of the gas turbine engine.

According to an aspect there is provided a gas turbine engine comprising the apparatus or assemblies as described and/or claimed herein.

The inner shroud may comprise a plurality of inner shrouds segments. Each inner shroud segment may only extend part way around the circumference. The method of manufacturing a set of variable stator vanes as described and/or claimed herein may be applied to each inner shroud segment sequentially.

Each inner shroud segment may extend around any desired angle, for example any angle that can be multiplied by a whole number to give 360 degrees, for example 60 degrees, 72 degrees, 90 degrees, 120 degrees or 180 degrees.

The arrangement as described and/or claimed herein may reduce the required compression of the inner shroud during assembly of the set of variable stator vanes.

The arrangement as described and/or claimed herein may allow two paths for the load to be transferred between the shaft and the bearing housing. This means that the effective length of the bearing arrangement can be increased without requiring the shaft to extend along the whole length of the bearing.

The skilled person will appreciate that except where mutually exclusive, a feature described in relation to any one of the above aspects may be applied mutatis mutandis to any other aspect. Furthermore except where mutually exclusive any feature described herein may be applied to any aspect and/or combined with any other feature described herein.

DESCRIPTION OF THE DRAWINGS

Embodiments will now be described by way of example only, with reference to the Figures, in which.

DETAILED DESCRIPTION

Figure 2:
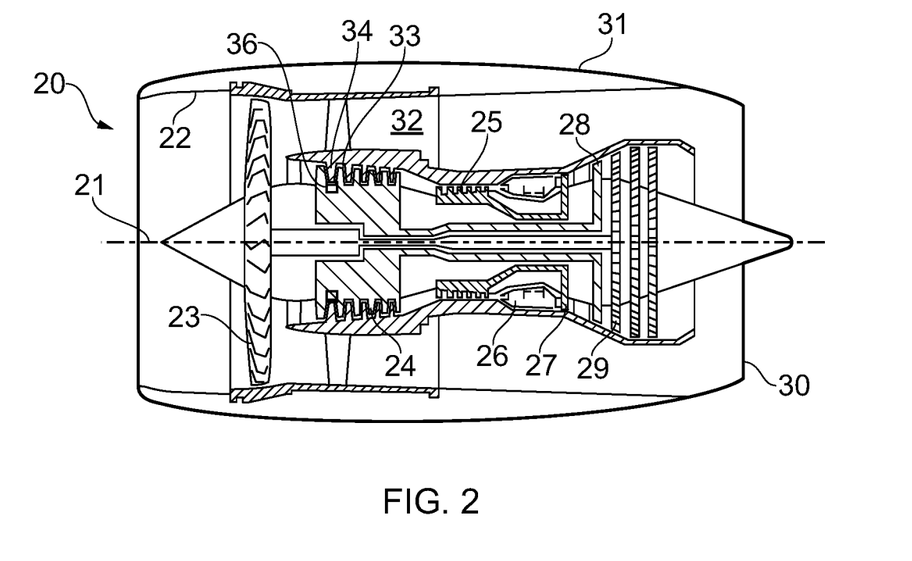
FIG. 2 is a sectional side view of a gas turbine engine in accordance with an aspect of the present disclosure.

With reference to FIG. 2, a gas turbine engine is generally indicated at 20, having a principal and rotational axis 21. The engine 20 comprises, in axial flow series, an air intake 22, a propulsive fan 23, an intermediate pressure compressor 24, a high-pressure compressor 25, combustion equipment 26, a high-pressure turbine 27, an intermediate pressure turbine 28, a low-pressure turbine 29 and an exhaust nozzle 30. A nacelle 31 generally surrounds the engine 20 and defines both the intake 22 and the exhaust nozzle 30.

The gas turbine engine 20 works in the conventional manner so that air entering the intake 22 is accelerated by the fan 23 to produce two air flows: a first air flow into the intermediate pressure compressor 24 and a second air flow which passes through a bypass duct 32 to provide propulsive thrust. The intermediate pressure compressor 24 compresses the air flow directed into it before delivering that air to the high pressure compressor 25 where further compression takes place.

The compressor 24 can be seen to be made up of rotors 33 and stators 34. In FIG. 2, the stator vane 34 is an example of a stator that is a variable stator vane. Any stator may be a variable stator vane. However generally it is the stators towards the front of the compressor that are variable stator vanes. The variable stator vane 34 extends from the gas path outer to inner annulus and rotates about an axis which is approximately in the radial or spanwise direction with respect to the main engine axis, to accommodate changes in the incidence angle of the compressor airflow.

The radially inner portion of the stator vane 34 may comprise a bearing arrangement 36 as described and/or claimed herein, as shown in the FIG. 2 example. In other embodiments other variable stator vanes may include a bearing as described and/or claimed herein.

The compressed air exhausted from the high-pressure compressor 25 is directed into the combustion equipment 26 where it is mixed with fuel and the mixture combusted. The resultant hot combustion products then expand through, and thereby drive the high, intermediate and low-pressure turbines 27, 28, 29 before being exhausted through the nozzle 30 to provide additional propulsive thrust. The high 27, intermediate 28 and low 29 pressure turbines drive respectively the high pressure compressor 25, intermediate pressure compressor 24 and fan 23, each by suitable interconnecting shaft.

Other gas turbine engines to which the present disclosure may be applied may have alternative configurations. By way of example such engines may have an alternative number of interconnecting shafts (e.g. two) and/or an alternative number of compressors and/or turbines. Further the engine may comprise a gearbox provided in the drive train from a turbine to a compressor and/or fan.

Figure 3:
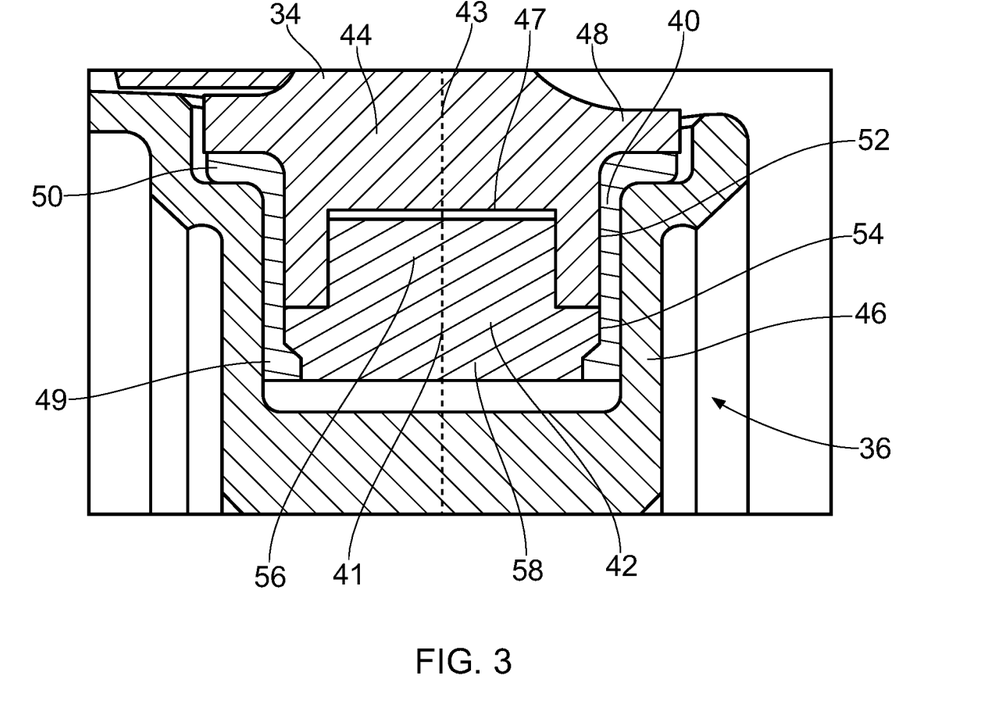
FIG. 3 is a sectional view of a bearing arrangement in accordance with the present disclosure.

FIG. 3 shows an example of the bearing arrangement 36 in greater detail. The bearing arrangement 36 comprises a shaft 44 that extends from a blade 34. In other embodiments the shaft 44 may extend from a different component. The shaft fits within a bearing housing 46. The shaft has a recess 47 in its end. A first bush 40 is positioned between the shaft 44 and the bearing housing 46. A second bush 42 is positioned such that it contacts both the inside of the recess 47 and the first bush 40.

The shaft 44 in FIG. 3 is circular. The shaft 44 has a rotational axis 43 along its centre. The shaft 44 rotates about its rotational axis 43. Note that the rotational axis 43 is not aligned with the engine axis 21 of FIG. 2. Once assembled in the gas turbine engine 20, the rotational axis 43 of the shaft 44 may be generally aligned with the radial direction of the gas turbine engine 20. The shaft may have a shorter length than it has diameter, as shown in FIG. 3. The shaft 44 has a shaft flange 48 around its circumference that extends radially outwardly with respect to its rotational axis 43. The flange 48 contacts a bush flange 50 of the first bush 40. Some arrangements in accordance may not include the shaft flange 48 and/or bush flange 50. In the FIG. 3 example, the first bush 40 is annular and circular. It has a central axis 41. When the bearing assembly is assembled the central axis 41 of the first bush 40 is aligned with the shaft 44 rotational axis 43. At a first end, that in an assembled state is proximal the shaft 44, the first bush 40 extends radially outwardly (with respect to its own central axis 41) to create the bush flange 50 that follows the shape of the shaft flange 48. A second end (distal with respect to the shaft 44) of the first bush 40 has a radially inwardly extending lip 49. The lip 49 and the bush flange 50 improve the resistance to axial loads from the shaft 44 of the component.

The first bush 40 has a radially (with respect to central axis 41) inner first portion 52 and a radially (with respect to central axis 41) inner second portion 54. The inner first portion 52 and inner second portion 54 are portions on the inner surface of the annular first bush 40. The inner first portion 52 is in contact with the shaft 44. The inner second portion 54 is in contact with the second bush 42. In FIG. 3, the inner first portion 52 and the inner second portion 54 are two different parts of the same surface, however in other embodiments there may be a step or discontinuity between the inner first portion 52 and inner second portion 54, for example where the outer diameter of the shaft 44 is different to the outer diameter of the second bush 42.

The end of the shaft 44 has a recess 47. The radius of the recess 47 may be greater than half the radius of the end of the shaft 44, as in the FIG. 3 example. The recess 47 may be cylindrical, as in the FIG. 3 example. The inside of the recess 47 is shaped such that it accommodates the second bush 42. In an assembled configuration there may be a gap between the deepest portion of the recess 47 and the second bush 42, as in the FIG. 3 example. In an assembled configuration there may be a gap between the end of the shaft 44 and the second bush 44.

The second bush 42 as shown in FIG. 3 may be described as a cylindrical stepped component. The second bush 42 may have a main section 58 and a stem 56, as shown in the FIG. 3 example. The stem 56 may be thinner (i.e. have smaller radius) than the main section 58. The main section 58 has a recess at its base to accommodate the lip 49 of the first bearing 40, although it will be appreciated that such recess and/or lip are optional, and may not be present.

The outer radius of the main section 58 may be the same as the outer radius of the shaft 44, which results in the configuration shown in FIG. 3 whereby the inner first portion 52 and inner second portion 54 are two parts of the same surface. The first bush 40 is in contact with the outer radial surfaces of the shaft 44 and the main section 58.

The first bush 40 and second bush 42 are designed to transmit the radial and axial load from the component, through the shaft 44, to the bearing housing 46. The radial and axial loads are, for example, with respect to the rotational axis 43 of the shaft 44. The radial and axial loads are, for example, loads experienced by the variable stator vane. They are made of materials suitable for the aerospace environment and the loads associated with aerospace components. If the component connected to the shaft 44 is a variable guide vane, the materials and design of the bearing will be suitable for the loads associated with a variable guide vane. For example the bushes could be made from a polymer, such as Vespel™. The shaft 44 and bearing housing 46 could be made from metal (for example steel, aluminium, titanium or nickel alloys, or any metal suitable for aerospace environments).

The first bush 40 and second bush 42 act together to transfer the radial loads (with respect to the shaft rotational axis 43) from the shaft 44 to the housing 46. Radial load is transferred between the shaft 44 and the first bush 40 directly. This radial load is transferred between the contact area that extends along the axial direction of the shaft 44 between the shaft 44 and the first bush 40.

Radial load is also transferred between the shaft 44 and the second bush 42 (e.g. via the stem 56). The second bush 42 then transfers this radial load to the first bush 40 through the axially extending contact area between the lower cylindrical section of the second bush 42 and the first bush 40.

The first bush 40 then transfers the radial load to the bearing housing on its outer, lengthwise surface.

By allowing two paths for the radial load to be transferred between the shaft 44 and the bearing housing 46, the length of the bearing can be increased without requiring the shaft 44 to extend along the whole length of the bearing.

The first bush 40 also acts to transfer the axial load (with respect to the shaft rotational axis 43) between the shaft 44 and the bearing housing 46. The shaft 44 transfers axial load to the flat portion 50 of the first bush 40 via the flanges 48. The first bush 40 then transfers the axial load to the base of the bearing housing 46 via the lip 49. The lip 49 is of greater radial thickness than the main section of the first bush 40, such that the contact pressures are reduced. For example the contact pressures are reduced at an axial end face of the first bush 40.

It is also possible to transfer axial load from the shaft 44 to the second bush 42, and subsequently to the distal end of the bearing housing 46. However a gap can be left between the end of the shaft 44 and the second bush 42 such that the only route of transferring axial load between the shaft 44 and the bearing housing 46 is via the first bush 40. For example a gap can be left between the deepest part of the recess 47 and the second bush 42 and/or a gap can be left between the axial end of the shaft 44 and the second bush 42.

The design as described and/or claimed herein (for example the design shown in FIG. 3) is reasonably insensitive to the tolerances between its constituent components. This may be partly due to the fact that if there is greater contact between two of the components they will wear faster and a balance of contact stresses will be restored.

Figure 4:
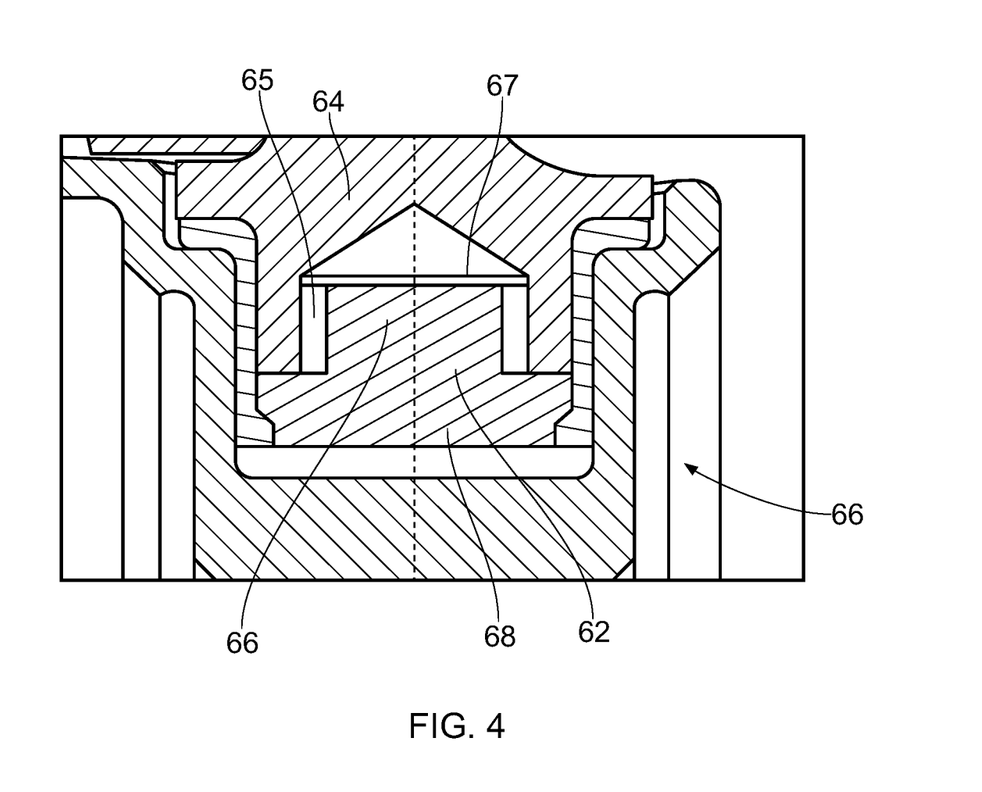
FIG. 4 is a sectional view of an alternative bearing arrangement in accordance with the present disclosure.

FIG. 4 shows a bearing arrangement 66 that is an alternative embodiment to the FIG. 3 example, in which the second bush 62 comprises a third bush portion 65 that engages a shaft 64.

In FIG. 4, the third portion bush 65 is positioned between the inside of the recess 67 and the second bush 62. The second bush 62 comprises a main section 68 and a stem 66. In order to accommodate the third bush portion 65, the radius of the stem 66 is less than the radius of the recess 67. The third bush portion 65 is then positioned between the stem 66 and the recess 67. The third bush portion is arranged across a contact area between the stem and the recess of the shaft. For example the contact area may be the axially extending (with respect to the central axis 41) contact area between stem 56 and the recess 47. The third bush portion 65 is annular and cylindrical. There is a radial step between the stem 66 and the main section 68 to accommodate the widths of the third bush portion 65 and the section of the shaft 64 around the recess 67.

In the FIG. 4 example the recess 67 has a conical end at its deepest portion. However in other embodiments the recess 67 may be flat at its deepest portion, as in the FIG. 3 example.

Figure 5:
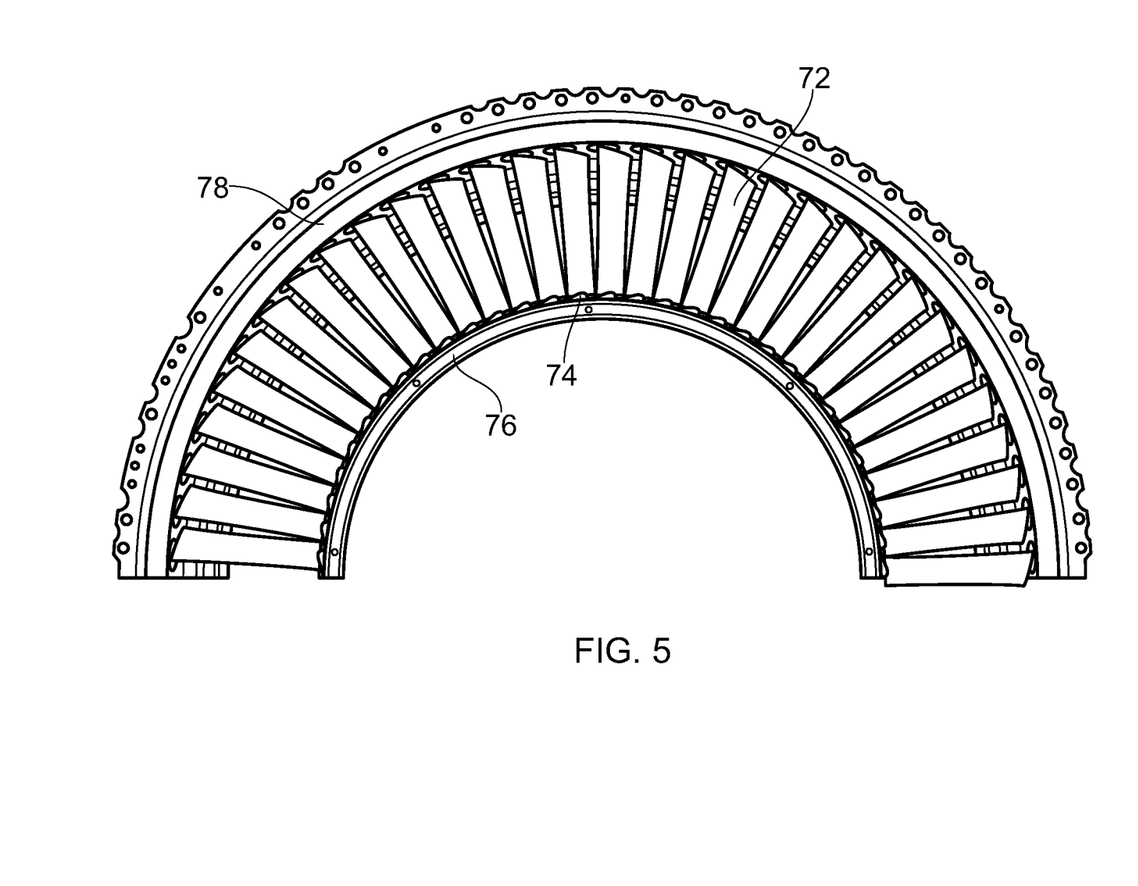
FIG. 5 shows an arrangement of a plurality of VSV bushes arranged between an outer casing and an inner shroud, in accordance with the present disclosure.

FIG. 5 shows an arrangement of a plurality of variable stator vanes (VSVs) 72 arranged between an outer casing 78 and an inner shroud 76. Between each VSV 72 and the inner shroud 76 are located a bearing arrangement 74 as described and/or claimed herein.

The inner shroud 76 contains a number of bearing housings equal to the number of VSVs 72. Each bearing housing may be as described and/or claimed herein, for example as shown by the example of FIG. 3 or FIG. 4. The bearing housings are blind holes, that is to say that they are only open at one end. The inner shroud 76 is a split ring inner shroud, and in FIG. 5 extends around half of the circumference.

The set of VSVs 72 may be assembled into the arrangement shown in FIG. 5 using following method. Firstly the VSVs 72 are located within the outer casing 78. The top end, i.e. the radially outer end in use, of each VSV 72 is received by features of the outer casing 78, for example a bearing. The inner shroud 76 is then introduced radially. For example the inner shroud 76 is introduced from a position radially inward of the set of VSVs 72 that are assembled around at least a part of the circumference of the outer casing 78. This requires that the inner shroud 76 is pulled in on its own radius, positioned inboard of the set of VSVs 72, and then allowed to expand on its own radius again. Tooling may be required to compress the inner shroud 56 due to the stiffness of the inner shroud 76. As the inner shroud 76 is allowed to expand on radius, each of the shafts (equivalent to shaft 44 of FIG. 3) of the VSVs 72 engage into the plurality of bearings 74. Each bearing 74 of the inner shroud 76 has a second bush (for example the second bush 42 of FIG. 3) already inserted into it before the inner shroud 76 is allowed to expand on radius again. As the shafts of each VSV are inserted into the bearing housings 74 they will engage with the second bushes. For example they will engage in the manner of the arrangement shown in the FIG. 3 or FIG. 4 example.

FIG. 5 only shows half of the circumference of the gas turbine. The arrangement shown in FIG. 5 may extend around the entire circumference of the gas turbine. The inner shroud 76 of FIG. 5 is a split ring inner shroud that only extends around half of the gas turbine. Therefore in the arrangement shown in FIG. 5 there will be a second inner shroud (not shown) for the opposing side of the set of VSVs (also not shown) in order to complete the circumferential arrangement. The second inner shroud will be assembled into the circumference in the same manner as the inner shroud 76 shown in FIG. 5. In other embodiments there may be more split ring inner shrouds. For example there may be 3, 4, 5, 6 or more than 6 inner shrouds completing the circumference.

Advantageously, because a second bush is already within each bearing housing of the inner shrouds, and the second bushes contribute to the length of the bearing as shown in the FIG. 3 or FIG. 4 example, the bearing length can be increased whilst minimising the amount the inner shrouds need to be pulled inwards in order to assemble them into the arrangement shown in the FIG. 5 example. By increasing the length of the bearing the contact stress and therefore wear rate of the bearing may be reduced, and the life of the bearing may be increased.

It will be understood that the invention is not limited to the embodiments above-described and various modifications and improvements can be made without departing from the concepts described herein. Except where mutually exclusive, any of the features may be employed separately or in combination with any other features and the disclosure extends to and includes all combinations and sub-combinations of one or more features described herein.

I claim:

1. A bearing arrangement for a gas turbine engine, the bearing arrangement comprising:
   a shaft with a recess in an end of the shaft;
   a bearing housing;
   an annular first bush comprising an inner first portion and an inner second portion; and
   a second component that engages the recess of the shaft; wherein
   the first bush bears against the bearing housing;
   the shaft engages the inner first portion of the first bush; and
   an outside diameter of the second component engages the inner second portion of the first bush.

2. The bearing arrangement according to claim 1, wherein:
   the second component comprises a main section and a stem extending from the main section, the stem being thinner than the main section;
   the stem engages the recess of the shaft; and
   the main section is in contact with the inner second portion of the first bush.

3. The bearing arrangement according to claim 1, wherein:
   the second component comprises a main section and a stem extending from the main section, the stem being thinner than the main section;
   the second component further comprises an annular third bush portion, wherein the third bush portion is positioned between the stem and the recess of the shaft so as to engage the recess of the shaft; and the main section is in contact with the inner second portion of the first bush.

4. The bearing arrangement according to claim 1, wherein:
the bearing housing is formed of a blind hole in a solid component.

5. The bearing arrangement according to claim 1, wherein:
the shaft does not rotate more than 180 degrees in use.

6. A bearing assembly comprising the bearing arrangement according to claim 1, the bearing assembly further comprising a rotatable component wherein:
the shaft extends from the rotatable component; and
the rotatable component is a variable stator vane of the gas turbine engine.

7. The bearing assembly according to claim 6, wherein:
the bearing housing is formed in an inner shroud of the gas turbine engine.

8. A set of variable stator vanes for a gas turbine engine comprising:
a plurality of bearing assemblies according to claim 6; and
an inner shroud of the gas turbine engine, wherein:
each bearing housing is formed in the inner shroud; and wherein
the bearing housings are regularly spaced around the inner shroud.

9. A set of variable stator vanes according to claim 8, wherein:
the inner shroud is a split ring inner shroud that only extends part way around the circumference of the gas turbine engine.

10. A gas turbine engine comprising the bearing assembly according to claim 6.

11. A method of manufacturing a set of variable stator vanes that includes a plurality of bearing arrangements with each of the bearing arrangements comprising a shaft with a recess in an end of the shaft, the shaft extending from a variable stator vane of a gas turbine engine; a bearing housing; an annular first bush comprising an inner first portion and an inner second portion; a second component that engages the recess of the shaft, the first bush bearing against the bearing housing, the shaft engaging the inner first portion of the first bush, the second component engaging the inner second portion of the first bush; and the set of variable stator vanes including an inner shroud of the gas turbine engine that is a split ring inner shroud that only extends part way around the circumference of the gas turbine engine; the bearing housing of each of the bearing arrangements being formed in the inner shroud, the bearing arrangements being regularly spaced around the inner shroud; and an outer casing of the gas turbine engine, the method comprising:
assembling a plurality of variable stator vanes into the outer casing such that the variable stator vanes project radially inwardly from the outer casing around the circumference of the outer casing;
placing each first bush and second component into their respective bearing housing;
compressing the inner shroud such that a radius of the inner shroud is reduced;
positioning the inner shroud radially inward of the assembled variable stator vanes;
releasing the compression on the inner shroud such that the inner shroud is allowed to return to its original radius, and in the process the shaft of each variable stator vane is inserted into each corresponding bearing housing on the inner shroud.

12. The method according to claim 11, wherein:
the inner shroud comprises a plurality of inner shrouds segments, wherein each inner shroud segment only extends part way around the circumference, and wherein the method of claim 11 is applied to each inner shroud segment sequentially.

13. The method according to claim 12, wherein each inner shroud segment extends around 180 degrees.

* * * * *